Figure 1:
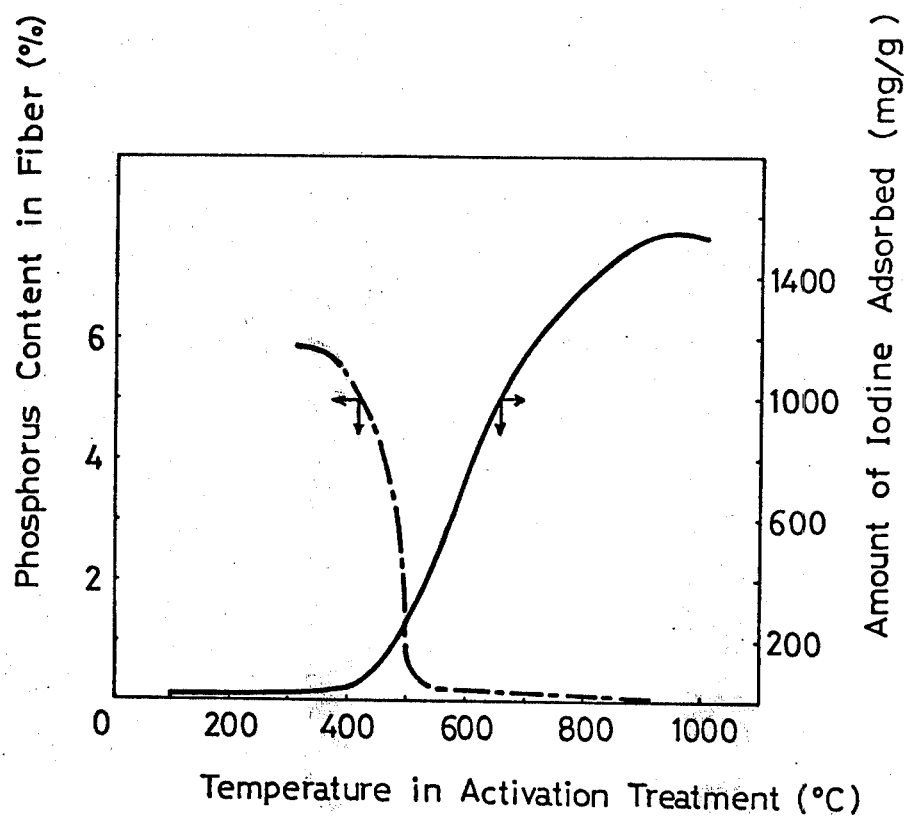

United States Patent [19]

Fukuda et al.

[11] 3,969,268

[45] July 13, 1976

[54] PROCESS FOR PREPARING ACTIVE CARBON FIBERS

[75] Inventors: Takashi Fukuda; Nobuo Ishizaki; Shoichi Iwahori; Masayoshi Shimada, all of Otsu, Japan

[73] Assignee: Toyobo Co., Ltd., Japan

[22] Filed: Dec. 31, 1974

[21] Appl. No.: 537,761

[52] U.S. Cl.............................. 252/423; 252/444; 252/445
[51] Int. Cl.² ........................................ B01J 21/18
[58] Field of Search.................. 252/423, 444, 445; 423/447, 460

[56] References Cited
UNITED STATES PATENTS 1,819,165   8/1931   Hass.................................. 252/423

*Primary Examiner*—J. Poer
*Attorney, Agent, or Firm*—Stewart and Kolasch, Ltd.

[57] ABSTRACT

A process for preparing active carbon fibers which comprises (a) providing a cellulose fiber with a phosphorus compound reactive thereto, (b) subjecting the resulting fiber to heat treatment at about 200° to 350°C until the decreased percentage of fiber becomes about 40 to 75 % (W/W) and then (c) subjecting the resultant fiber to activation treatment at about 450° to 1000°C in an atmosphere containing not less than about 5 % (V/V) of steam until the decreased percentage of fiber becomes about 65 to 95 % (W/W), the said phosphorus compound showing a residual percentage of phosphorus of not less than about 70 % (W/W) after the heat treatment of the step (b) and a residual percentage of phosphorus of not more than about 10 % (W/W) after the activation treatment of the step (c).

23 Claims, 1 Drawing Figure

PROCESS FOR PREPARING ACTIVE CARBON FIBERS

The present invention relates to a process for preparing active carbon fibers, which have a high adsorption ability and are useful as adsorbents for deodorization, decolorization, refining and the like.

As adsorbents for deodorization, decolorization or refining of gaseous or liquid substances, there have heretofore been employed active carbon, silica gel, acidic terra abla, etc. These conventional materials are, however, sufficiently effective only when used with a thickness of at least several centimeters, and the loss of pressure as a filter is too large. Further, powdery dust is readily formed on their preparation or use. In addition, it is difficult to mold them into a desired compact form. Particularly when they are used as a filter for purification of air, these drawbacks bring about undesirable results.

For the purpose of diminishing the loss of pressure, there has been proposed a filter in which active carbon, a catalyst or an ion-exchange resin is adhered to a fiber, a nonwoven fabric, a foam product or the like. In such filter, however, the adsorption ability is deteriorated in comparison with the case of using powdery or granular adsorbents, and the particles of the adsorptive material may readily fall off from the support.

An active carbon fiber, which is prepared by heating a regenerated cellulose fiber in an inactive atmosphere under specific conditions and then activating the fiber with steam at an elevated temperature, is advantageously utilizable as an adsorbent without such problems as mentioned above. However, conventional processes for preparation of such active carbon fiber are all not satisfactory. For instance, the carbon fiber prepared by the process as described in Japanese Patent Publication No. 12376/1963 is insufficient in the adsorption ability and the strength, and an extremely long duration of time is required for the heat treatment and the activation in the process.

As the result of an extensive study for overcoming the said drawbacks, there has now been completed a process which can produce active carbon fibers having a high adsorption ability and a high strength from cellulose fibers in a good yield within a short period of time.

According to the invention, there is provided a process for preparing active carbon fibers which comprises (a) providing a cellulose fiber with a phosphorous compound reactive thereto, (b) subjecting the resulting fiber to heat treatment at about 200° to 350°C until the decreased percentage of fiber becomes about 40 to 75 % (W/W) and then (c) subjecting the resultant fiber to activation treatment at about 450° to 1000°C in an atmosphere containing not less than about 5 % (V/V) of steam until the decreased percentage of fiber becomes about 65 to 95 % (W/W), the said phosphorus compound showing a residual percentage of phosphorus of not less than about 70 % (W/W) after the heat treatment of the step (b) and a residual percentage of phosphorus of not more than about 10 % (W/W) after the activation treatment of the step (c).

Throughout the specification, the term "decreased percentage of fiber" is intended to mean the percentage of the decreased weight ($\Delta W$) of the fiber after a certain treatment to the dry weight (W) of the fiber as the starting material and can be calculated according to the equation:

$$\Delta W \times 100 / W.$$

The term "residual percentage of phosphorus" is intended to mean the percentage of the weight (Wr) of the phosphorus compound (in terms of phosphorus) remaining after any treatment to the weight (Wi) of the phosphorus compound (in terms of phosphorus) provided to the starting fiber and can be calculated according to the equation:

$$Wr \times 100 / Wi.$$

The cellulose fiber to be used as the starting material in the invention may be a natural cellulose fiber such as cotton, hemp or ramie, a pulp fiber obtained from woods, bamboos or linter, a regenerated cellulose fiber such as viscose rayon, polynosic fiber or cuprammonium rayon, etc. These fibers may be employed in any optional form such as a tow, web, felt or fabric.

In the process of the invention, the cellulose fiber is first subjected to treatment with a phosphorus compound, unlike conventional processes in which the starting fiber is directly subjected to carbonization and activation.

Treatment of the starting cellulose fiber with the phosphorus compound may be carried out usually in water or a suitable organic solvent. Thus, the phosphorus compound is frequently employed in the form of a solution containing the same, for instance, in a concentration of about 1 to 60 % (W/W). In case of a regenerated cellulose fiber, the phosphorus compound may be incorporated into a spinning mixture on preparation of the fiber to obtain a fiber containing the phosphorus compound.

The phosphorus compound is required to be reactive with hydroxyl groups or other functional groups in cellulose at a temperature of about 200° to 350°C so as to remain in the fiber and to show a residual percentage of phosphorus of not less than about 70 % (W/W), preferably not less than about 80 % (W/W). It is not necessary for the phosphorus compound to remain in the original form given to the fiber.

Further, the linkage of the phosphorus compound with the carbonized cellulose molecule is required to be decomposed or broken at a temperature of about 450°C or higher and to show a residual percentage of phosphorus of not more than about 10 % (W/W), preferably not more than about 1 % (W/W).

Examples of the phosphorus compound which satisfy the said requirements are oxy acids of phosphorus (e.g. phosphoric acid, metaphosphoric acid, pyrophosphoric acid, phosphorous acid, phosphonic acid, phosphonous acid, phosphinic acid, phosphinous acid) and their salts and esters such as alkyl or aryl esters, phosphonium salts (e.g. tetrakis(hydroxymethyl)phosphonium salts), phosphines (e.g. tris(hydroxymethyl)phosphine, tris(1-aziridinyl)phosphine), phosphine oxides (e.g. tris(hydroxymethyl)phosphine oxide, tris(1-aziridinyl)phosphine oxide), etc. Polyphosphates and polyphosphonates of the following formulae:

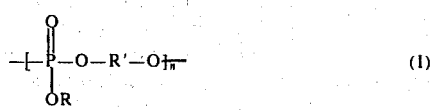

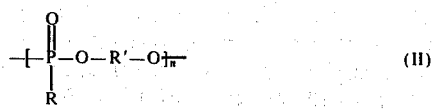

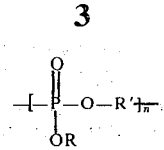

(III)

wherein R is a monovalent hydrocarbon residue having 1 to 18 carbon atoms (optionally substituted with halogen), R' is a divalent hydrocarbon residue having 1 to 18 carbon atoms (optionally substituted with halogen) and n is an integer of 3 or more are also utilizable The amount of the phosphorus compound to be provided to the fiber is usually from about 0.5 to 20 % (W/W), preferably from 2 to 10 % (W/W), as phosphorus to the dry weight of the fiber. When the amount is larger than about 20 % (W/W), the finally obtained active carbon fiber may be partially hung up.

In addition to the phosphorus compound, a nitrogen-containing compound may be provided to the cellulose fiber for enhancing the action of the phosphorus compound so as to increase the strength and the yield of the product and to shorten the time required for the whole operations.

Examples of such nitrogen-containing compound are ammonium hydroxide, ammonium salts of organic and inorganic acids (e.g. ammonium carbonate, ammonium chloride, ammonium nitrate, ammonium sulfate, ammonium hydrogensulfate, ammonium sulfite, ammonium hydrogensulfite, ammonium thiosulfate, ammonium acetate), amines (e.g. triethylamine, triethanolamine pyridine, aniline), urea, thiourea, melamine, guanine, cyanuric acid, ethyl cyanurate, carboxylic acid amides, sulfonic acid amides, ammonium imidosulfonate, ammonium sulfamate, condensation products of formaldehyde with urea, melamine, guanine or dicyandiamide, etc.

When the phosphorus compound contains a nitrogen atom, its sole use can produce the same effect as in the case of the combined use as above mentioned. Examples of such nitrogen-containing phosphorus compound are ammonium phosphate, diammonium hydrogenphosphate, ammonium dihydrogenphosphate, dimethylphosphonopropaneamide, ammonium polyphosphate, polyphosphonitrile chloride, condensation products of phosphoric acid, tetrakis(hydroxymethyl)-phosphonium salt or tris(1-aziridinyl)phosphine oxide with urea, thiourea, melamine, guanine, cyanamide, hydrazine, dicyandiamide or their methylol derivatives, etc. Thus, ammonium salts of oxy acids of phosphorus, condensation products of phosphoric acid with urea and the like are utilizable.

In any event, the proportion of the nitrogen-containing compound (as nitrogen) to the phosphorus compound (as phosphorus) may be usually 0.1 – 5.0 : 1 by weight or 0.1 – 20 : 1 (preferably 0.5 – 5 : 1) by atomic number ratio.

The phosphorus compound thus provided with or without the nitrogen-containing compound to the starting fiber reacts with the cellulose usually in the subsequent heat treatment or during elevation of the temperature leading to such treatment. Therefore, any particular operation for the reaction between the fiber and the phosphorus compound is not always necessitated. If necessary, however, suitable treatment of the fiber may be optionally effected before or after adherence of the phosphorus compound for assuring its fixation to the fiber.

The cellulose fiber provided with the phosphorus compound is then subjected to heat treatment at a temperature from about 200° to 350°C, preferably from about 250° to 350°C, until the decreased percentage of fiber becomes from about 40 to 75 % (W/W), preferably from about 45 to 65 % (W/W).

When the temperature of the atmosphere in the treatment is higher than about 350°C, the ultimately obtained active carbon fiber is greatly deteriorated in physical properties such as strength and elongation. When the temperature is too low, on the contrary, a sufficient adsorption ability can not be obtained.

The elevation of the temperature up to the said temperature range may be performed under any optional condition. For example, the temperature is gradually elevated up to the said temperature range, or the starting fiber is directly introduced into an atmosphere kept in the said temperature range.

The heat treatment requires usually a period of about 1 to 60 minutes. This treatment is not a mere preliminary calcination but is an important step determining the adsorption ability of the final product. When the decreased percentage of fiber is smaller than about 40 % (W/W), the adsorption ability of the product is unsatisfactory. Supposedly, the dehydration and carbonization of the fiber during this treatment has a great influence on the formation of pores and active groups effective for adsorption in the subsequent activation treatment.

The heat treatment may be carried out in any atmosphere, although a low concentration of oxygen is preferred.

Such atmosphere may comprise inert gases such as nitrogen, argon, carbon dioxide and carbon monoxide, gases obtained by combustion of hydrocarbons, preferably having not more than 6 carbon atoms (e.g. methane, ethane, propane, butane, ethylene, butylene), oxidative gases such as air and the like. There may be also employed the decomposition gas generated during the heat treatment in the process of the invention from which condensation components and acidic substances are eliminated. Among them, the use of the combustion gases is particularly preferred, because the activation in the subsequent step can be accomplished more easily within a shorter period of time using a smaller amount of steam.

The fiber as above heat treated is then subjected to an activation treatment at about 450° to 1,000°C in an atmosphere containing not less than about 5 % (V/V), preferably about 10 to 70 % (V/V), of steam until the decreased percentage of fiber becomes from about 65 to 95 % (W/W), preferably from about 70 to 90 % (W/W).

By appropriately selecting the temperature of the atmosphere and the treatment time, the adsorption ability of the product can be optionally controlled. For example, when the activation is effected at a temperature of about 450° to 700°C, the mean diameter of pores in the produced fiber is small, and the distribution is in a sharp state, so that the product is suitable for adsorption of low molecular weight substances. When the activation is effected at a temperature of about 700° to 1000°C, the mean diameter of pores of the product is large, the distribution being in a broad state, and the content of active groups is increased, so that the product is suitable for adsorption of high molecular weight substances and polar substances, and besides, it shows a catalytic activity. For obtaining a sufficient adsorption ability, the decreased percentage of fiber is required to be about 65 to 95 % (W/W). When it is smaller than about 65 % (W/W), the adsorption ability is insufficient. When larger than about 95 % (W/W), the strength of the product is markedly lowered.

For effecting the activation treatment, the temperature may be gradually elevated from the temperature of the atmosphere in the heat treatment of the foregoing step. Alternatively, the atmosphere for the activation treatment at a certain temperature may be formed separately and independently from the atmosphere in the heat treatment of the foregoing step. Further, the activation treatment may be effected while gradually elevating the temperature of the atmosphere.

The components other than steam in the atmosphere are not necessarily required to be inactive. But, it is preferred to suppress the content of oxidative gases such as oxygen, nitrogen oxides and sulfur oxides to an amount of not more than 5 % (V/V). Thus, the preferred components in the atmosphere are nitrogen, argon, hydrogen, carbon dioxide, carbon monoxide, combustion gas, ammonia, etc.

In the activation treatment, the phosphorus atom in the fiber begins to be rapidly removed from the fiber at a temperature of around 450°C, and at the same time, a higher adsorption ability appears. Supposedly, fine pores effective for adsorption are produced on removal of the phosphorus atom in the fiber, accompanied by formation of active groups such as aldehyde groups, ketone groups and carboxyl groups. Such phenomenon is not observed in an atmosphere comprising an inert gas (e.g. nitrogen) alone. In case of using a fiber having no phosphorus compound, an adsorption ability can be obtained only when it is heated at a temperature of 750°C or higher in an atmosphere containing steam, and such adsorption ability is extremely low.

Still, the heat treatment and the activation treatment as illustrated above may be effected continuously, or any heat treatment wherein the temperature is elevated in an atmosphere containing no steam may be interposed between them.

According to the process of the invention, an active carbon fiber having a much higher adsorption ability and showing excellent strength and elongation can be obtained in a better yield, compared with the case of conventional processes in which no phosphorus compound is added to a fiber. Further, the time required for completion of the whole process can be greatly shortened, because the phosphorus compound markedly promotes the activation with steam.

The following table shows the comparison between the process of the invention and a conventional process (Japanese Patent Publication No. 12376/1963):

|  | Process of invention | Conventional process |
|---|---|---|
| Time required for completion of whole process (hrs.) | 1.5–3.0 | 10–25 |
| Amount of adsorbed iodine (mg/g) | 500–2,000 | 500–1,000 |
| Amount of adsorbed benzene (mg/g) | 300–900 | 100–300 |
| Toluene-adsorption rate (min$^{-1}$) | ca.10 | ca.1 |
| Tensile strength (1000 kg/cm$^2$) | 2.0–4.5 | 0.5–1.5 |
| Elongation (%) | ca.3.0 | ca.0.8 |
| Yield (%) | 10–40 | 3–15 |

The active carbon fiber of the invention shows not only strong deodorizing and decolorizing effects but also a high adsorption ability for nitrogen oxides, sulfur oxides and organic solvents (e.g. benzene, toluene, phenol). In addition, it exhibits a catalytic activity. In the fiber of the invention, the equilibrium adsorption amount and the adsorption rate are so large that a sufficient interceptive effect can be usually attained even with a thickness of 1 mm for a long period of time.

Since the strength and elongation of the active carbon fiber of the invention are excellent, it can be readily processed, for instance, into a felt or other forms by the use of a card. The active carbon fiber in a felt form can be also prepared by subjecting a fiber previously processed into a felt to heat treatment and activation treatment as described above. The thus prepared fiber in a felt form may be further processed by the aid of a needle punch so as to make it compact, or it may be used in combination with another felt of organic fibers or the like. Further, the fibers in a web form may be piled on each other to obtain a laminated filter. Furthermore, the fiber in a felt form may be shaped into a suitable form such as a zig-zag or a bag. By such shaping, the loss of pressure, the life and the like may be appropriately changed depending on the desired purposes.

Since the active carbon fiber of the invention has an excellent adsorption ability and can be shaped into various forms as mentioned above, it is utilizable for a variety of purposes. Particularly, the use as an air-filter in a felt form is advantageous. It can be also employed advantageously in adsorption and recovery apparatuses for organic solvents, adsorption apparatuses for sulfur dioxide gas and nitrogen oxide gas, masks and the like.

Practical and presently preferred embodiments of the invention are illustratively shown in the following Examples wherein parts are by weight and % is weight by weight unless otherwise indicated. The amount of adsorbed benzene is determined according to JIS (Japanese Industrial Standard) K 1412 (the amount of the specimen being changed to 1 g), and the amount of adsorbed iodine is determined by immersing the specimen (500 mg) into a 1/50 N iodine-potassium iodide solution (25°C) for 30 minutes while shaking and measuring the amount of adsorbed iodine by titration.

EXAMPLE 1

A polynosic fiber (regenerated cellulose fiber having an average molecular weight of not less than 400) (5 denier; 5 cm) is impregnated with a designed amount of a 10 % aqueous solution of phosphoric acid and then dried. The resulting fiber bearing 0.05 to 25 % of phosphoric acid (as phosphorus) with respect to the dry weight of the fiber is placed into an atmosphere of a propane-combustion gas (composition: $N_2$, 80 %, CO, 5 %; $CO_2$, 10 %; $O_2$, 2 %; steam and other components, 3 %). The temperature is elevated up to 270°C in 5 minutes, and the same temperature is kept for 30 minutes. After completion of this heat treatment at low temperature, the fiber is subjected to activation treatment at 850°C for 30 minutes in the combustion gas as mentioned above but containing 30 % (V/V) of steam. The properties of the thus obtained active carbon fiber are shown in Table 1. In all of the cases, the residual percentage of phosphorus after the heat treatment at low temperature is not less than 95 %, and that after the activation treatment is not more than 1 %.

For comparison, the same procedure as above is repeated but without treatment with phosphoric acid. The properties of the obtained active carbon fiber are also shown in Table 1.

Table 1

| Amount of deposited phosphorus (%) | | 0 | 0.05 | 1.5 | 18 | 25 |
|---|---|---|---|---|---|---|
| Decreased percentage of fiber (%) | After heat treatment at low temperature | 60 | 59 | 50 | 47 | 45 |
| | After activation treatment | 95 | 87 | 80 | 78 | 77 |
| Properties of active carbon fiber product | | | | | | |
| State | | Partially burned during treatment | Fragile with hang-up | Flexible without hang-up | Flexible without hang-up | Lots of hang-up parts |
| Tensile strength (1000 kg/cm²) | | <1 | 1.8 | 3.5 | 4.0 | 3.0 |
| Elongation (%) | | <1 | 1.5 | 2.5 | 3.0 | 1.5 |
| Amount of adsorbed iodine (mg/g) | | — | 1000 | 1400 | 1550 | 1570 |
| Amount of adsorbed benzene (mg/g) | | — | 200 | 450 | 650 | 900 |

Reference Example 1

A polynosic fiber as used in Example 1 is subjected, directly without treatment with phosphoric acid, to heat treatment at low temperature at 150°C for 1 hour, at 200°C for 1 hour, at 230°C for 1.5 hours, at 260°C for 30 minutes and at 300°C for 1 hour in order in a nitrogen stream. Then, the temperature is elevated up to 750°C in 1.5 hours, and the same temperature is kept for 30 minutes while introducing 30 % (V/V) of steam so as to effect activation.

In spite of the gradual elevation of the temperature for a long duration of time in an atmosphere free from oxygen, the decreased percentage of fiber amounts to 92 %. The product is extremely fragile, the tensile strength and the elongation being respectively 0.7 × 1000 kg/cm² and 1.5 %, and shows only a low adsorption ability, the amounts of adsorbed iodine and adsorbed benzene being respectively 700 mg/g and 150 mg/g. Thus, it is not suitable for practical use.

EXAMPLE 2

The same procedure as in Example 1 is repeated but using diammonium hydrogenphosphate in place of phosphoric acid. The properties of the obtained active carbon fiber are shown in Table 2. In all of the cases, the residual percentage of phosphorus after the heat treatment at low temperature is not less than 95 %, and that after the activation treatment is not more than 1 %.

For comparison, the same procedure as above is repeated but without treatment with diammonium hydrogenphosphate. The properties of the obtained active carbon fiber are also shown in Table 2.

By the use of the nitrogen-containing compound (i.e. diammonium hydrogen-phosphate), there are attained improvement in the tensile strength and the elongation as well as reduction in the decreased percentage of fiber (i.e. improvement in the yield). The adsorption ability of the product is almost the same as in the case of using phosphoric acid.

Table 2

| Amount of deposited phosphorus (%) | | 0 | 0.05 | 1.5 | 18 | 25 |
|---|---|---|---|---|---|---|
| Amount of deposited nitrogen (%) | | 0 | 0.055 | 1.66 | 19.9 | 27.7 |
| Decreased percentage of fiber (%) | After heat treatment at low temperature | 55 | 54 | 52 | 50 | 45 |
| | After activation treatment | 95 | 85 | 70 | 73 | 72 |
| Properties of active carbon fiber product | | | | | | |
| Tensile strength (1000 kg/cm²) | | <1 | 2.0 | 3.8 | 4.5 | 2.7 |
| Elongation (%) | | <1 | 2.0 | 2.6 | 3.0 | 1.8 |
| Amount of adsorbed iodine (mg/g) | | — | 960 | 1370 | 1530 | 1520 |

EXAMPLE 3

A web (500 g/m²) of a polynosic fiber (5 denier; 5 cm) is impregnated with a 15 % aqueous solution of polyphosphoric acid (degree of polymerization, 3 - 10) and then dried. The resulting web bearing 5 % of polyphosphoric acid (as phosphorus) with respect to the dry weight of the fiber is subjected to heat treatment at 265°C for 30 minutes in the air. The decreased percentage of fiber and the residual percentage of phosphorus after the treatment are 55 % and 95 %, respectively. Then, the temperature is elevated up to 850°C while replacing the atmosphere by a propane-combustion gas as used in Example 1, and the same temperature is kept for 30 minutes during which 30 % (V/V) of steam is introduced so as to effect activation. Ultimately, the decreased percentage of fiber and the residual percentage of phosphorus are 85 % and 0.05 %, respectively. The properties of the obtained web are as follows: amount of adsorbed iodine, 1700 mg/g; amount of adsorbed benzene, 600 mg/g.

EXAMPLE 4

A mixture of 85 % phosphoric acid (115 parts) and urea (60 parts) is heated at 110° to 130°C while removing off the produced gas and steam. After 1 hour, it is confirmed that the pH value of the reaction mixture (in the form of a 5 % aqueous solution) is 4. Then, the heating is stopped, and the reaction mixture is allowed to stand for cooling. The thus prepared phosphoric acid-urea condensation product (140 parts) is admixed with water (1260 parts) to obtain a 10 % aqueous solution.

In the above aqueous solution (5000 parts), a tow of a polynosic fiber (500 parts) is immersed for 30 minutes, pressed by the aid of a mangle and dried at 100°C for 30 minutes. The resulting fiber bearing 3 % of phosphorus is subjected to heat treatment at 250°C for 15 minutes in the air to obtain a black fiber (306 parts) in which the residual percentage of phosphorus is 98 %. The fiber is then placed into an atmosphere of nitrogen-containing 50 % (V/V) of steam, and the temperature is elevated up to 800°C at a rate of 5°C/min to effect activation whereby an active carbon fiber (153 parts) is obtained: Residual percentage of phosphorus, 0.1 %; carbon content, 90 %; amount of adsorbed iodine, 1300 mg/g; tensile strength, 5 × 1000 kg/cm².

EXAMPLE 5

A solution of a polyphosphonate having repeating units of the formula:

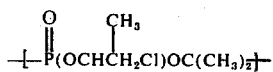

(average molecular weight, 4,500) in trichlene is admixed with a viscose (cellulose concentration, 5.0 %; NaOH, 3.0 %; falling-ball viscosity, 185 sec; γ value, 71) in a proportion of the polyphosphonate to the cellulose of 10 : 100 by weight. The resultant viscose is spun through a spinning cap (hole diameter, 0.07 mm; number of holes, 40) into an acid bath containing sulfuric acid (17 g/L), sodium sulfate (50 g/L) and zinc sulfate (0.5 g/L) at 25°C and is then subjected to desulfurizing, water washing and acid treatment by conventional procedures to obtain a polynosic fiber (2.5 denier). Phosphorus content, 2.0 %. Dry strength, 3.5 g/d. Dry elongation, 13 %.

The above obtained fiber is subjected to heat treatment in the air by elevation of the temperature up to 350°C at a rate of 10°C/min. The decreased percentage of fiber and the residual percentage of phosphorus after the treatment are 50 % and 97 %, respectively. Then, the fiber is placed into an atmosphere of nitrogen, and the temperature is elevated at a rate of 10°C/min. When the temperature reaches around 400°C, a nitrogen stream containing 30 % (V/V) of steam begins to be introduced, and the temperature is further elevated up to 800°C. After the temperature of 800°C is maintained for 20 minutes, the introduction of a steam-containing nitrogen is stopped, and the reaction system is cooled to room temperature under a nitrogen stream to obtain an active carbon fiber having an extremely high adsorption ability. Decreased percentage of fiber, 73 %. Residual percentage of phosphorus, 0.1 %. Strength, 3.2 g/d. Elongation, 3.0 %. Young's modulus, 150 g/d. Amount of adsorbed iodine, 1500 mg/g. Amount of adsorbed benzene, 400 mg/g.

Reference Example 2

A needle punch felt (300 g/m²) of a polynosic fiber (5 denier; 5 cm) is immersed into a 15 % aqueous solution of diammonium hydrogenphosphate, pressed and dried. The resulting felt bearing 3.8 % of the phosphate (as phosphorus) with respect to the dry weight of the fiber is placed into an atmosphere of nitrogen, and the temperature is elevated up to 300°C in about 5 minutes. The same temperature is maintained for 30 minutes. The decreased percentage of fiber, the phosphorus content and the residual percentage of phosphorus after the heat treatment at low temperature are 45 %, 6 % and 90 %, respectively. Then, elevation of the temperature is continued at a rate of 600°C/hr up to a designed temperature, and the same temperature is kept for 30 minutes in the stream of nitrogen containing 30 % (V/V) of steam so as to effect activation. The relationship of the phosphorus content in the thus obtained active carbon fiber and the amount of iodine adsorbed by the fiber with the temperature in the activation treatment are shown in FIGURE 1 of the accompanying drawing. As is apparent from this FIGURE, the separation of phosphorus becomes marked from a temperature around 450°C, and at the same time, the adsorption ability is greatly increased.

What is claimed is:

1. A process for preparing active carbon fibers which comprises (a) providing a cellulose fiber with a phosphorus compound reactive thereto, (b) subjecting the resulting fiber to heat treatment at about 200° to 350°C until the decreased percentage of fiber becomes about 40 to 75 % (W/W) and then (c) subjecting the resultant fiber to activation treatment at about 450° to 1000°C in an atmosphere containing not less than about 5 % (V/V) of steam until the decreased percentage of fiber becomes about 65 to 95 % (W/W), the said phosphorous compound showing a residual percentage of phosphorus of not less than about 70 % (W/W) after the heat treatment of the step (b) and a residual percentage of phosphorus of not more than about 10 % (W/W) after the activation treatment of the step (c).

2. The process according to claim 1, wherein the phosphorus compound is an oxy acid of phosphorus or an ester or salt thereof, a polyphosphate, a polyphosphonate, a phosphine, a phosphine oxide or a phosphonium salt.

3. The process according to claim 2, wherein the phosphorus compound is a polyphosphate of the formula:

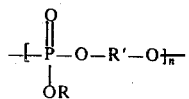

wherein R is a monovalent hydrocarbon residue having 1 to 18 carbon atoms, R' is a divalent hydrocarbon residue having 1 to 18 carbon atoms and $n$ is an integer of 3 or more.

4. The process according to claim 2, wherein the phosphorus compound is a polyphosphate of either one of the formulae:

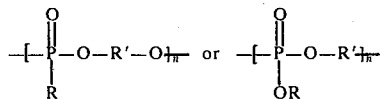

wherein R is a monovalent hydrocarbon residue having 1 to 18 carbon atoms, R' is a divalent hydrocarbon residue having 1 to 18 carbon atoms and $n$ is an integer of 3 or more.

5. The process according to claim 1, wherein the phosphorus compound is provided to the fiber in an amount of about 0.5 to 20 % (W/W).

6. The process according to claim 5, wherein the phosphorus compound is provided to the fiber in an amount of about 2 to 10 % (W/W).

7. The process according to claim 1, wherein the phosphorus compound is provided in the form of a solution.

8. The process according to claim 7, wherein the solution is an aqueous solution containing the phosphorus compound in a concentration of 3 to 60 % (W/W).

9. The process according to claim 1, wherein the fiber is provided with a nitrogen-containing compound.

10. The process according to claim 9, wherein the nitrogen-containing compound has a boiling point of not less than about 100°C.

11. The process according to claim 9, wherein the nitrogen-containing compound is ammonium hydroxide, an ammonium salt of an organic or inorganic acid, urea, thiourea, an amine having a boiling point of not less than about 100°C or a compound having a urethane bond, an amide bond or a urea bond and a molecular weight of not less than 200.

12. The process according to claim 9, wherein the nitrogen-containing compound is the same as the phosphorus compound.

13. The process according to claim 12, wherein the nitrogen-containing compound is an ammonium salt of an oxy acid of phosphorus or a condensation product of an oxy acid of phosphorus with urea.

14. The process according to claim 9, wherein the proportion of the nitrogen-containing compound as nitrogen and the phosphorus compound as phosphorus is 0.1 – 5.0 : 1 by weight.

15. The process according to claim 1, wherein the heat treatment is carried out in an atmosphere comprising a combustion gas of a hydrocarbon having 1 to 6 carbon atoms.

16. The process according to claim 15, wherein the hydrocarbon is methane, ethane, propane, butane, heptane, ethylene or butylene.

17. The process according to claim 15, wherein the treatment is carried out until the decreased percentage of fiber becomes about 45 to 65 % (W/W).

18. The process according to claim 1, wherein the activation treatment is carried out in an atmosphere containing about 10 to 70 % (V/V) of steam.

19. The process according to claim 18, wherein the treatment is carried out until the decreased percentage of fiber becomes about 70 to 90 % (W/W).

20. The process according to claim 3, wherein R is substituted with halogen.

21. The process according to claim 3, wherein R' is substituted with halogen.

22. The process according to claim 4, wherein R is substituted with halogen.

23. The process according to claim 4, wherein R' is substituted with halogen.

* * * * *